(12) United States Patent
Grenfell

(10) Patent No.: US 9,905,028 B2
(45) Date of Patent: Feb. 27, 2018

(54) SIMULATING SUB-SURFACE SCATTERING OF ILLUMINATION FOR SIMULATED THREE-DIMENSIONAL OBJECTS

(71) Applicant: Adobe Systems Incorporated, San Jose, CA (US)

(72) Inventor: Desmond T. Grenfell, Rossendale (GB)

(73) Assignee: Adobe Systems Incorporated, San Jose, CA (US)

( * ) Notice: Subject to any disclaimer, the term of this patent is extended or adjusted under 35 U.S.C. 154(b) by 877 days.

(21) Appl. No.: 14/103,489

(22) Filed: Dec. 11, 2013

(65) Prior Publication Data

US 2015/0161816 A1    Jun. 11, 2015

(51) Int. Cl.
| | |
|---|---|
| G06T 15/50 | (2011.01) |
| G06T 11/00 | (2006.01) |
| G06T 15/80 | (2011.01) |
| G06T 15/08 | (2011.01) |
| G06T 17/00 | (2006.01) |

(52) U.S. Cl.
CPC ............ G06T 11/001 (2013.01); G06T 15/08 (2013.01); G06T 15/506 (2013.01); G06T 15/80 (2013.01); G06T 17/00 (2013.01); G06T 2210/62 (2013.01)

(58) Field of Classification Search
None
See application file for complete search history.

(56) References Cited

U.S. PATENT DOCUMENTS

| | | | | |
|---|---|---|---|---|
| 5,563,989 A | * | 10/1996 | Billyard ................ | G06T 15/506 345/426 |
| 2009/0109220 A1 | * | 4/2009 | Tomson ................ | G06T 15/506 345/424 |
| 2009/0174703 A1 | * | 7/2009 | Hermanson ............ | G06T 13/60 345/419 |

(Continued)

OTHER PUBLICATIONS

Jensen et al., Aug. 2001, A practical model for subsurface light transport. In Proceedings of the 28th annual conference on Computer graphics and interactive techniques (pp. 511-518). ACM.*

(Continued)

*Primary Examiner* — Saptarshi Mazumder
(74) *Attorney, Agent, or Firm* — Kilpatrick Townsend & Stockton LLP

(57) ABSTRACT

Embodiments involve simulating sub-surface scattering of illumination for three-dimensional objects. An application determines, for each point defining a simulated three-dimensional surface, a respective first simulated light at the point caused by a simulated light source illuminating the three-dimensional surface. Each first simulated light includes a weighted average of simulated incident light at the point. Each weighted average is determined based on simulated incident light contributions from neighboring points of the three-dimensional surface. The application also determines, for each point, a respective second simulated light at the point. Each second simulated light includes light from the light source that is diffusively reflected at the point. The application also generates, for each point, a respective correction factor for the simulated light source to compensate for a difference between the first and second simulated lights by specifying a modification to color information generated based on the second simulated light.

20 Claims, 4 Drawing Sheets

(56) References Cited

U.S. PATENT DOCUMENTS

2009/0254293 A1* 10/2009 Tartaglia ................. G06T 15/50
702/85

OTHER PUBLICATIONS

Keng, et al.. "An efficient caching-based rendering of translucent materials the Visual Computer", Visual Comput (2007) Jan. 2007, vol. 23, Issue 1, pp. 59-69.*

* cited by examiner

SIMULATING SUB-SURFACE SCATTERING OF ILLUMINATION FOR SIMULATED THREE-DIMENSIONAL OBJECTS

TECHNICAL FIELD

This disclosure relates generally to computer-implemented methods and systems and more particularly relates to simulating sub-surface scattering of illumination for simulated three-dimensional objects.

BACKGROUND

Three-dimensional modeling applications generate, manipulate, or otherwise use computer-generated models of three-dimensional objects. Simulating a three-dimensional object in a realistic manner may be difficult due to the complexities of how light interacts with real-world materials. For example, real-word objects may exhibit sub-surface scattering effects in which light enters one point of a surface, is diffusively reflected through the surface, and exits at another point in the surface. Variations in the sub-surface scattering of light through translucent materials such as ceramics, plastics, rubbers and flesh may cause portions of the material to appear more or less saturated in color.

For example, FIG. 1 depicts an example of an object 102 illuminated by light that has undergone sub-surface scattering. The object 102 includes a uniformly illuminated surface 104 and an occluded surface 106 at a right angle to the uniformly illuminated surface 104. The occluded surface 106 includes a region 108 that appears black or nearly black in color and a region 110 that appears to have a more saturated version of the color of the illuminated surface 104.

FIG. 2 is a lateral view of the object 102 that depicts the sub-surface scattering of light 204 through the object 102. A light source 202 emanates light toward the surface 104. The light 204 enters the object 102 via the surface 104. Some of the light 204 is fully absorbed by the object 102. The absorption of the light 204 prevents light from exiting the surface 106 in the region 108, thereby causing the region 108 to appear black or nearly black in color. Some of the light 204 is scattered and exits the object 102 through the surface 104. Some of the light 204 travels through the object 102 and exits the object 102 at the region 110. The light 204 that exits at the region 110 may travel further through the object 102 than light that enters and exits the object 102 via the surface 104. The light 204 that exits at the region 110 may therefore experience greater sub-surface scattering than light that enters and exits the surface 104. The greater sub-surface scattering of the light 204 exiting at the region 110 may cause coloring of the region 108 to appear more saturated to the human eye than the light exiting via the surface 104.

Simulating the sub-surface scattering effects depicted in FIGS. 1-2 in a realistic manner may involve extensive processing resources. To avoid excessive use of processing resources, prior solutions for simulating three-dimensional objects omitted the simulation of sub-surface scattering or used overly simplistic computational models that reduced the realism with which the sub-surface scattering effects were rendered.

Improved methods for simulating sub-surface scattering in the illumination of simulated three-dimensional objects are desirable.

SUMMARY

One embodiment involves a method for simulating sub-surface scattering of illumination for simulated three-dimensional objects.

The method involves determining, for each of multiple points defining a simulated three-dimensional surface, a respective first simulated light at the point caused by a simulated light source illuminating the three-dimensional surface. The respective first simulated light includes a respective weighted average of simulated incident light. The respective weighted average of simulated incident light is determined based on simulated contributions of incident light from neighboring points of the three-dimensional surface. The method also involves determining, for each of the points, a respective second simulated light at the point caused by the simulated light source. The respective second simulated light includes light from the simulated light source that is diffusively reflected at the point. The method also involves generating, for each of the points, a respective correction factor for the simulated light source to compensate for a difference between the respective first simulated light and the respective second simulated light. The respective correction factor specifies a modification to color information generated by a rendering process based on the respective second simulated light.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Various features, embodiments, and advantages of the present disclosure are better understood when the following Detailed Description is read with reference to the accompanying drawings, where.

DETAILED DESCRIPTION

Figure 1:
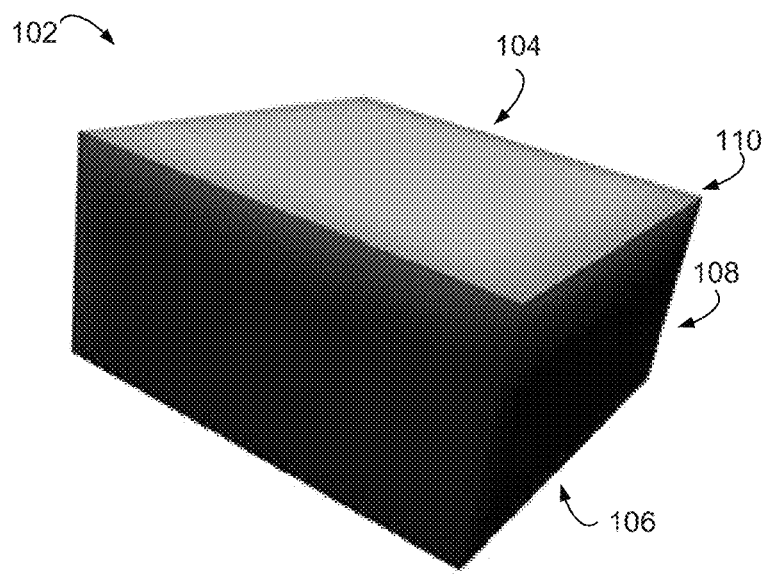
FIG. 1 is a perspective view depicting an example of sub-surface scattering of light illuminating an object.
Figure 2:
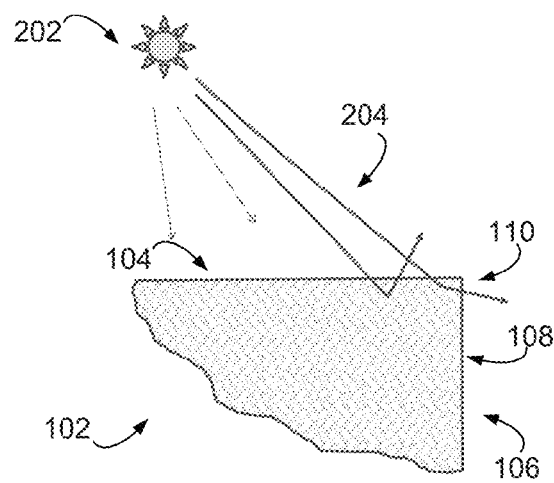
FIG. 2 is a lateral view of the object of FIG. 1 depicting an example of the scattering of light.

Computer-implemented systems and methods are disclosed for simulating sub-surface scattering of illumination for simulated three-dimensional ("3D") objects.

The following non-limiting example is provided to help introduce the general subject matter of certain embodiments. An image manipulation application or other suitable graphics editor program for drawing and editing 3D objects generates data describing a simulated 3D object. This data includes information for simulating illumination of the object by a light source. To simulate illumination of the object, the graphics application determines amounts of light "incident" at different portions of the illuminated object. For example, a 3D surface may be specified as having a given color. A given amount of "illumination" can be simulated by lightening or darkening the specified color for the 3D surface. Increased amounts of incident light at the surface can be simulated by rendering the surface with a lighter color and decreased amounts of incident light at the surface can be simulated by rendering the surface with a darker color. Rendering the surface with lighter or darker color can involve modifying the saturation or intensity of the specified color for the surface.

A rendering process, which may be a component of the graphics editor program or any other program with image display capabilities (e.g., a web browser), uses the data describing the 3D object to render the object for display. The rendering process calculates how much simulated light is "emitted" at each visible point along the surface of the object and adjusts the rendered coloring of the object at each point to simulate the illumination at each point. However, the incident light values calculated by the rendering process may not accurately simulate light emitted at different points as a result of sub-surface scattering. For example, a rendering process may simulate the effect of light from a light source being diffusively reflected at a first point at the surface of an object, but may omit any simulation of light from the light source that enters the object at a second point along the surface and exiting through the first point along the surface. Such a rendering process may be relatively efficient with respect to the use of processing resources, but may sacrifice accuracy in simulating illumination resulting from sub-surface scattering in order to obtain that efficiency.

To improve the accuracy of a rendering process used to obtain the incident light values, the image manipulation application can determine an amount of simulated light that would be "emitted" at each point as a result of sub-surface scattering for each simulated light source. The simulated light resulting from sub-surface scattering can account for the geometry of the simulated surface in the vicinity of an illuminated point. A comparison of the incident light values resulting from sub-surface scattering and the incident light values initially calculated by the rendering process can be used to generate one or more correction factors. In some embodiments, the correction factors can be computed prior to a run-time rendering process and stored with a three-dimensional model and can therefore be independent of any given rendered view of the model. The rendering process can be modified to include the use of the correction factors to modify the initially calculated incident light values. In the modified rendering process, the image manipulation application can use the correction factors to adjust the rendered coloring of the object at each point in a manner that more realistically simulates illumination at each point that results from sub-surface scattering.

The pre-computed correction factors can be stored with the data defining the 3D object. In subsequent rendering processes performed at runtime, a computationally efficient process can be used to obtain initial incident light values. The stored correction factors can be used to modify the initial incident light values to obtain more accurate values. For example, a rendered color value $C_r$ may be determined from a formula $C_r=C_{obj}\times(L_{init}+L_{corr})$, where $C_{obj}$ represents a specified color for an object, a diffuse lighting term $L_{init}$ represents an initial incident light value at that point that is determined by the computationally efficient process, and a correction factor $L_{corr}$ is an additional diffuse lighting term that is pre-computed for simulating sub-surface scattering. Using the pre-computed correction factors $L_{corr}$ to adjust incident light values $L_{init}$ obtained from a computationally efficient process may provide enhanced performance as compared to explicitly simulating the effects of sub-surface scattering as part of the rendering process.

In accordance with some embodiments, an image manipulation application can determine, for each point defining a simulated three-dimensional surface, a respective first simulated light at the point caused by a simulated light source illuminating the three-dimensional surface. Each first simulated light includes a weighted average of simulated incident light at the point. Each weighted average is determined based on simulated incident light contributions from neighboring points of the three-dimensional surface. The image manipulation application can also determine, for each point, a respective second simulated light at the point. Each second simulated light includes light from the light source that is diffusively reflected at the point. The image manipulation application can also generate, for each point, a respective correction factor for the simulated light source to compensate for a difference between the first and second simulated lights by specifying a modification to color information generated by a rendering process based on the second simulated light that represents simulated light source that is diffusively reflected at the point.

As used herein, the term "simulated three-dimensional surface" is used to refer to electronically generated image content that can be rendered for display in a three-dimensional space. A simulated 3D object can be defined by a combination of 3D shapes, each of which is defined by one or more 3D surfaces. Data defining a simulated 3D surface can include properties such as a translucency, optical depth, color, texture, or other suitable property used to simulate a physical property of the surface.

As used herein, the term "simulated incident light" is used to refer to data associated with a simulated 3D surface identifying an amount of light that is to be simulated as reflected by, passing through, or otherwise emitted at a portion of a simulated 3D surface. Simulated incident light values can control or otherwise influence color information used to render the simulated 3D object. For example, data defining a simulated 3D object may specify that the object has a red color. To simulate illumination of the object, color information such as saturation or intensity may be modified such that a lighter shade of red is used to simulate higher illumination and a darker shade of red is used to simulate lower illumination. Incident light values can correspond to an amount of simulated illumination of the simulated 3D surface. The color information for each point along the surface can be adjusted based on a respective incident light value at that point.

As used herein, the term "weighted average of simulated incident light" is used to refer to a weighted average of simulated light contributions from multiple neighboring points to a target point. For example, a simulated 3D surface may include three points. The simulated incident light at a first point may include simulated light that enters the surface at each of the second and third points, is diffusively reflected through the surface via sub-surface scattering, and exits the surface at the first point. The light contributions of the second and third points to the light emitted at the first point include the light that is simulated as entering the second and third points and exiting at the first point. Applying a weight to each light contribution can simulate an attenuation of the light that travels to the first point from the second or third points. The weighted average of simulated light can represent the weighted contributions of light from neighboring points.

As used herein, the term "neighboring point" is used to refer to a point that contributes to the simulated incident light at another point in the simulated 3D surface.

As used herein, the term "rendering process" is used to refer to any process executed by a computing device to generate graphical data to be outputted to a display device.

Figure 3:
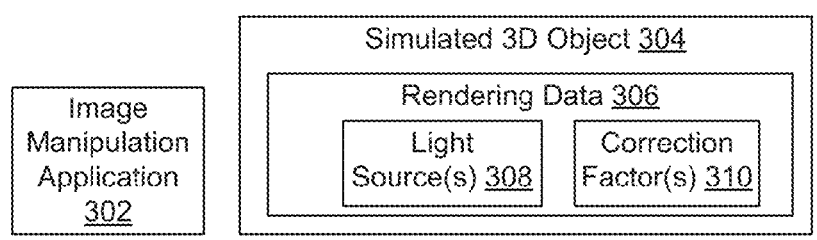
FIG. 3 is a block diagram depicting an example of an image manipulation application that can be executed by a processing device to manipulate a simulated three-dimensional object according to certain exemplary embodiments.

Referring again to the drawings, FIG. 3 is a block diagram depicting an example of an image manipulation application 302 that can be executed by a processing device to manipulate a simulated 3D object 304 according to certain exemplary embodiments. The simulated object 304 can include data defining one or more 3D shapes that are used to render the simulated object 304. The simulated object 304 can also include rendering data 306. Any suitable image manipulation application or other graphics editor program can be used to create the simulated 3D object 304 as well as the rendering data 304.

The rendering data 306 can specify one or more simulated light sources 308 and one or more correction factors 310. A simulated light source 308 can include data specifying how to render one or more colors of the object 304 such that the object 304 appears to be illuminated by a light source having a specified position and orientation with respect to the object 304.

A correction factor 310 can include data specifying how to modify color information generated by a rendering process. Modifying the color information using the correction factor can allow the simulated object 304 more realistically to exhibit the effects of sub-surface scattering of light that is radiated by one or more of the simulated light sources 308. The image manipulation application 302 can pre-compute the correction factors 310 based on the simulated light sources 308, as described in detail herein.

Rendering an object 304 without simulating the effects of sub-surface scattering can decrease the apparent realism or verisimilitude of a rendered version of the object 304. For example, FIG. 4 is a diagram depicting an example of a simulated 3D object 304 without simulated sub-surface scattering.

The view rendered by the image manipulation application 302 can depict the object 304 being illuminated by a simulated light source 308 that emanates light 402 from a position behind the object 304. Simulating the illumination of the object 304 can involve simulating an amount of light emitted at each point along a visible surface of the object 304 and modifying one or more color components of colors used to display the object 304. For example, the rendering data 304 can identify a diffuse color used for rendering the skin of the head by the image manipulation application 302. In a rendering process, the image manipulation application 302 can simulate illumination of the head by modifying one or more components of the diffuse color, such as hue, saturation, and intensity. For example, the image manipulation application 302 can simulate shadows in a region 405 by modifying the intensity of the skin color, thereby darkening the skin color used to display the region including "shadows." Thus, the image manipulation application 302 can use the values of simulated incident light at each point along a visible surface of the object 304 to modify coloring of that point in a manner that simulates illumination.

Figure 4:
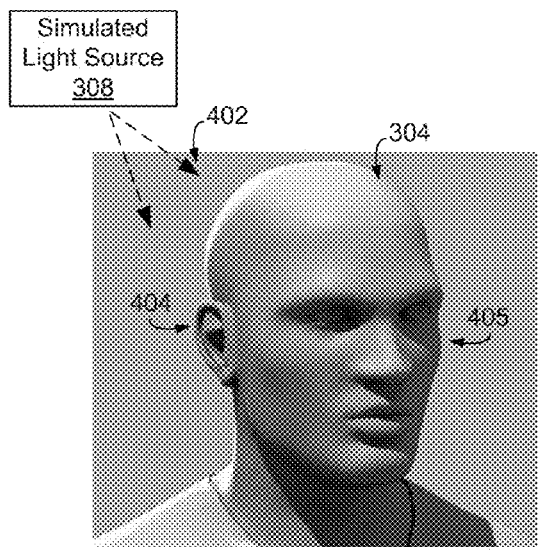
FIG. 4 is a diagram depicting an example of a simulated three-dimensional object without simulated sub-surface scattering according to certain exemplary embodiments.

FIG. 4 depicts an attempt to simulate the effects of light upon a real-word object. For real-world objects, the light emitted by an illuminated surface includes photons that enter the surface at a variety of adjacent points. The photons travel through the surface along a variety of paths. Each of the paths involves varying numbers of scattering events caused by interaction with the surface. At least some of the scattered photons are emitted at other portions of the surface. The emitted light perceived by the human eye includes photons having a range of colors that contribute to the perceived color of the surface.

Under ideal lighting conditions, sub-scattering can be simulated by applying a single characteristic diffuse color to a region of the object 304. Ideal lighting conditions include uniform illumination of a flat surface having an area that is large relative to an optical density of the surface (i.e., the depth to which the light penetrates the surface). For example, different regions of a flat object uniformly illuminated by a light would not be perceived by the human eye to have substantial differences in shading. Accordingly, sub-surface scattering can be simulated for a flat surface with uniform simulated illumination by uniformly modifying a color component used to display the flat surface. For example, simulating illumination of locally planar surfaces under uniform lighting can involve determining an average color and intensity of the incident light based on the product of a diffuse color of the simulated surface and an average color and intensity of the incident light.

Simulating the light based on this product may involve minimal computational resources, but may be inaccurate for surfaces that are not locally planar or where the illumination is significantly non-uniform (e.g., sharp edges and corners having shadows caused by occlusion). Realistically simulating the illumination of an object 304 may be difficult if the rendered view of the object 304 does not involve ideal lighting conditions. Non-ideal conditions include an illumination of the object 304 that is non-uniform, a surface geometry of the object 304 that is not flat, and/or an area of the object 304 that is insufficiently large relative to the optical density of the object 304. In these cases, multiplying the diffuse color of the simulated surface and the average color and intensity of the incident light may inaccurately simulate the color and intensity of the locally incident light.

For example, a region 404 of the object 304 depicted in FIG. 4 includes an ear with multiple curved surfaces rather than a planar surface. Rendering the region 404 involves rendering part of the region 404 with a lighter color of the skin and rendering other portions of the region 404 with a darker color of the skin due to the simulation of shadows. In the absence of simulated sub-surface scattering of light through the object 304, the shadows cast by the curvature of the ear in the region 404 may appear darker in the rendered object 304 than would be the case for a physical object being illuminated by a light source from the same angle.

Figure 5:
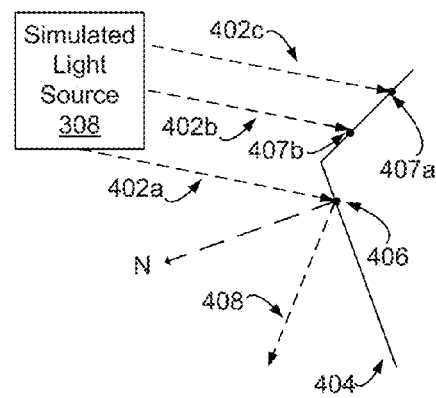
FIG. 5 is a diagram modeling simulated light used to determine color information without simulated sub-surface scattering according to certain exemplary embodiments.

FIG. 5 is a diagram modeling simulated light used to determine color information without simulated sub-surface scattering. For example, as depicted in FIG. 5, light 402a-c is simulated as illuminating points 406, 407a, 407b. The simulated light at point 406 is determined by simulating the light 402a being reflected as light 408. The light 408 can be determined based on an intensity and a direction of the light 402a, a normal N at the point 406a, and a diffuse reflectance parameter for the surface 404. As depicted in FIG. 5, although the light 402b, 402c illuminates respective points 407a, 407b neighboring the point 406, no sub-surface scattering effect through the object 304 is simulated. Thus, the diffusively reflected light 408 is used to determine the color information in FIG. 4. A simulated value for the diffusively reflected light 408 can be determined based on an intensity of the simulated light 402a, a scalar product of a vector representing the direction of the simulated light 402a and the normal N vector, and a reflectance parameter (e.g., a diffuse lighting term) specified for the surface 404 in the rendering data 306.

Figure 6:
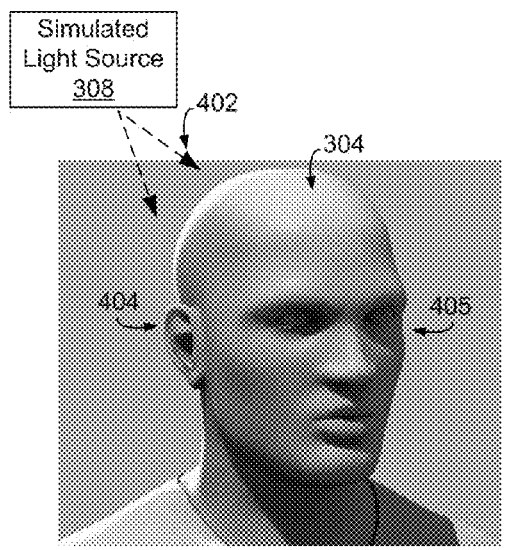
FIG. 6 is a diagram depicting an example of a simulated three-dimensional object that includes simulated sub-surface scattering according to certain exemplary embodiments.
Figure 7:
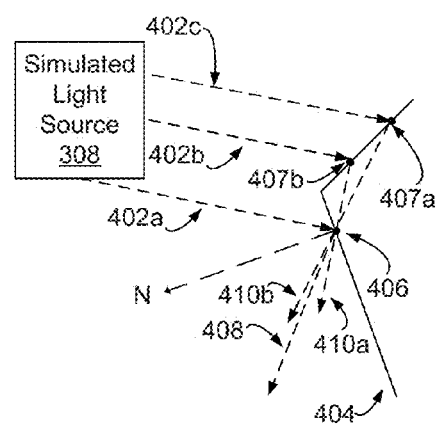
FIG. 7 is a diagram modeling simulated light used to determine color information without simulated sub-surface scattering according to certain exemplary embodiments.

The realism of the object 304 can be improved by simulating sub-surface scattering effects resulting from illumination of the object 304 by the simulated light source 308. FIG. 6 is a diagram depicting an example of a simulated 3D object 304 that includes simulated sub-surface scattering according to certain exemplary embodiments. The simulated 3D object 304 depicted in FIG. 6 includes visual effects corresponding to sub-surface scattering of light 402 through the object 304. For example, the region 404 appears lighter in color in FIG. 6 as compared to FIG. 4, thereby simulating the effect of the light 402 traveling through the ear. FIG. 7 is a diagram modeling simulated light used to determine color information with simulated sub-surface scattering. As depicted in FIG. 7, light 402b, 402c that illuminates respective points 407a, 407b is simulated as being diffusively reflected through the object 304. The light 410a, 410b is diffusively reflected through the object 304 from the respective points 407a, 407b to the point 406. Thus, a simulated light at the point 406 includes the light 408, 410a, 410b.

The image manipulation application 302 can simulate sub-surface scattering and can determine modified color information for the object 304 based on one or more correction factors 310. A correction factor 310 can indicate an amount by which one or more color components for a point can be modified to compensate for a difference between a first simulated light value obtained by simulating the effects of sub-surface scattering at the point and a second light value that is determined based on light incident upon the point being diffusively reflected at the point. Each of the correction factors 310 can be independent of a given view of the object 306 rendered at runtime.

For example, a correction factor 310 may indicate that a simulated amount of light emitted at the region 404 due to sub-surface scattering is greater than a simulated amount of light emitted at the region 404 generated by a rendering process used at runtime to render the object 304. The incident light values associated with simulated sub-surface scattering correspond to light 402 entering at the rear of the region 404 and exiting at the front of the region 404. Applying a correction factor to one or more color components for the region 404 can involve, for example, increasing the saturation of the color of at the region 404. Increasing the saturation and brightness of the color of at the region 404 lightens the color, thereby simulating increased illumination of the region 404 due to sub-surface scattering.

Figure 8:
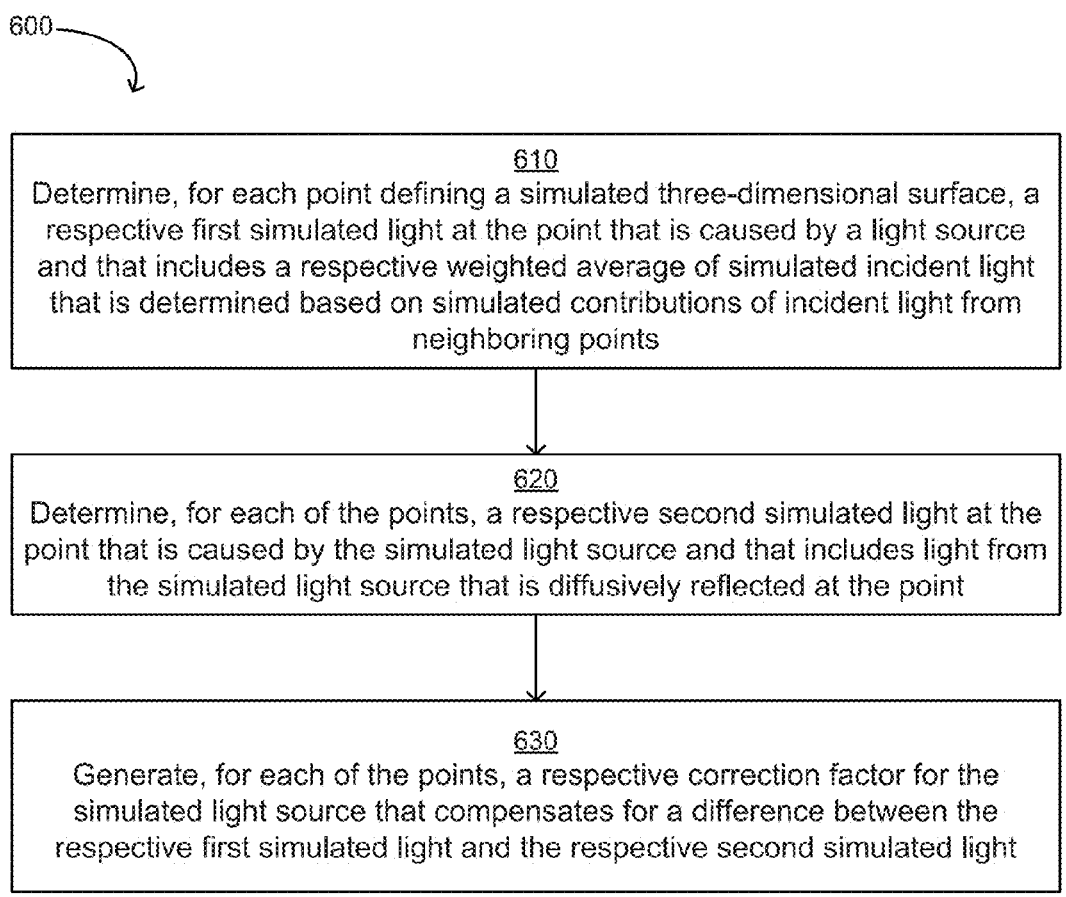
FIG. 8 is a flow chart depicting an example of a method for simulating sub-surface scattering of illumination of a simulated three-dimensional object according to certain exemplary embodiments.

The image manipulation application 302 can generate one or more correction factors 310 using any suitable process. For example, FIG. 8 is a flow chart depicting an example of a method 600 for simulating sub-surface scattering of illumination of a simulated 3D object according to certain exemplary embodiments. For illustrative purposes, the method 600 is described with reference to the examples depicted in FIGS. 3-7. Other implementations, however, are possible.

The method 600 involves determining, for each point defining a simulated three-dimensional surface, a respective first simulated light at the point that is caused by a light source and that includes a respective weighted average of simulated incident light that is determined based on simulated contributions of incident light from neighboring points, as depicted in block 610. For example, the image manipulation application 302 can determine weighted averages of incident light along the surfaces of the object 304 depicted in FIGS. 4 and 6. For each point, the image manipulation application 302 can determine a respective weighted average based on the combined contributions of simulated light from neighboring points in the vicinity of the point for which the weighted average is calculated. Neighboring points can include points that may be an arbitrary geodesic distance from the respective point. The weighted average of simulated light at a point can simulate the effect of light entering a simulated object 304 at a first set of points along the surface, traveling through the simulated object 304, and exiting the simulated object 304 at a second set of points along the surface. For example, the weighted average of incident light at a point along the front of the ear in the region 404 of FIG. 6 can include light entering the back of the ear, being diffusively reflected through the ear, and exiting at the point on the front of the ear.

Figure 9:
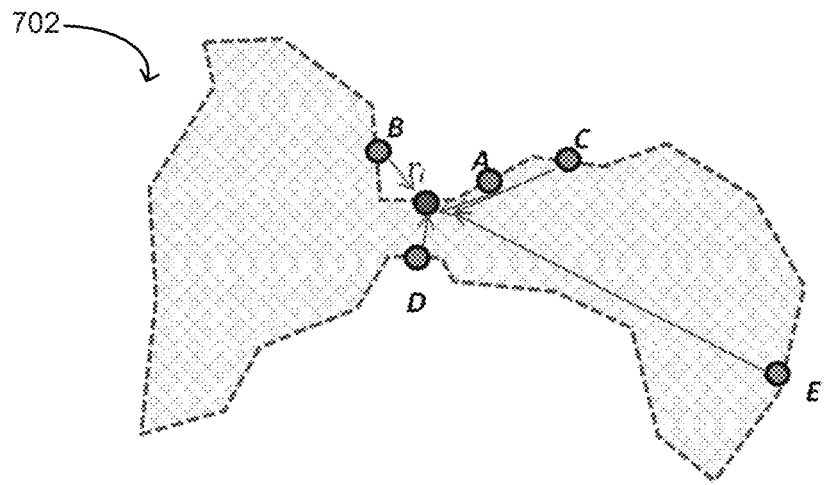
FIG. 9 is a modeling diagram depicting a summation of simulated light sources for determining a weighted average of simulated incident light at a point along a simulated three-dimensional surface according to certain exemplary embodiments.

For example, FIG. 9 is a modeling diagram depicting a summation of simulated light sources for determining a weighted average of simulated incident light at a point along a simulated 3D surface according to certain exemplary embodiments. FIG. 9 depicts simulated light incident at a point $r_i$ on a cross-section through a simulated 3D surface 702. The image manipulation application 302 can simulate a contribution to the light emitted at the point $r_i$ by the light entering the simulated 3D surface 702 at one or more of the points A, B, C, D, and E that neighbor the point $r_i$. For example, the image manipulation application 302 can simulate light entering the points A, C, D, and E and traveling through the simulated 3D surface 702 to the point $r_i$. The image manipulation application 302 can also simulate light being reflected from the point B toward the point $r_i$ and then being reflected again at the point $r_i$. The image manipulation application 302 can determine a weighted average of simulated light emitted at the point $r_i$ from the simulated light contributions from points A, B, C, D, and E.

Although FIG. 9 depicts the simulated light contributions from five points A, B, C, D, and E for illustrative purposes, the image manipulation application 302 can determine simulate light contributions at the point $r_i$ from any number of neighboring points $r_j$. The image manipulation application 304 can also calculate a weighted average of simulated light at each of points A, B, C, D, and E using a respective set of points that neighbor each of the points A, B, C, D, and E. Any suitable weighting process that simulates the effect of light being scattered through a surface 702 can be used in calculating the weighted average. A non-limiting example of such a weighting process is described in detail herein.

In some embodiments, determining the simulated light at each point can involve determining a simulated incident flux of the light at each point along a surface of the simulated 3D object 304. The simulated light can be incident light energy determined from a scalar product of an incident flux vector and a local surface normal vector. For example, the image manipulation application 302 can identify a surface of the object 304 that is specified as simulating a translucent surface that experiences sub-surface scattering, such as the skin covered regions depicted in FIGS. 4 and 6. The image manipulation application 302 can determine the incident flux at the points defining the surface that simulates the translucent material. In a non-limiting example, the object 304 can be defined using a set of points, edges, and triangles (i.e., a triangular mesh). A point order for the points can define outward-facing faces of the triangles. The outward-facing faces of the triangles can define the surface of the 3D object 304. In a rendering process, an incident flux can be simulated for each of the outward-facing faces of the triangles that define the surface of the 3D object 304. In some embodiments, the image manipulation application 302 can convert the simulated flux to a simulated incident light at each point using a Lambertian factor (i.e., a factor describing the apparent brightness of the simulated surface).

In some embodiments, the simulated incident light can be determined based on the local surface normal without any modulation by a normal or bump map. The correction factors 310 can be determined from weighted averaged incident energies that are computed without accounting for an applied normal map. Determining the correction factors 310 without accounting for the applied normal map can allow the correction factors 310 to be independent of a given rendered view of the object 304. In a rendering process, the correction factors 310 may be used in conjunction with a reflected light 408 that is computed using an applied normal map. Doing so can provide corrections for local geometry variations caused by the applied normal map.

Returning to FIG. 8, the method 600 also involves determining, for each of the points, a respective second simulated light at the point that is caused by the simulated light source and that includes light from the simulated light source that is diffusively reflected at the point, as depicted in block 620. For example, the image manipulation application 302 can calculate or otherwise determine the second simulated light value based on a simulated intensity of the light from the simulated light source, a simulated direction of the light from the simulated light source, and a simulated reflectance parameter of the three-dimensional surface Simulated light sources may include (but are not limited to) point lights, directional lights or lights having a more general angular variation, such as image-based lighting. Image-based lighting may be described in terms of an expansion of mathematical components of a light, such as spherical harmonics. These mathematical components may be simulated as light sources having negative intensities. Determining the local incident energy from a given light source can involve performing an integration over the surface of a scalar product of the incident angular flux from the simulated light source and a local surface normal. A value for the local incident energy calculated at render-time may differ from the weighted mean value of this quantity computed in the pre-computation stage due to variations in incident angular flux and the local surface normal in a runtime rendering process.

Simulated light sources may include, but are not limited to, point lights, directional lights or lights having a more general angular variation such as image based lighting that may be described in terms of an expansion of mathematical components such as spherical harmonics. These components may themselves be considered as light sources with the provision that they may have negative intensities. In order to determine the local incident energy from a given light source it is necessary to perform an integration over the sphere of the scalar product of the incident angular flux from the light source and the local surface normal. Since both the incident angular flux and the local surface normal may vary, the result of this integration will also vary. Consequently, the value for the local incident energy calculated at render-time will differ from the weighted mean value of this quantity computed in the pre-computation stage.

The method 600 also involves generating, for each of the points, a respective correction factor for the simulated light source that compensates for a difference between the respective first simulated light and the respective second simulated light, as depicted in block 630. A correction factor 310 can specify a modification to color information that is generated by a rendering process based on the respective second simulated light. In a non-limiting example, each correction factor 310 can be encoded in a single byte associated with a respective point of the object 304. At one or more points, the image manipulation application 302 can modify one or more of a hue, a saturation, or an intensity of a color used to display the region 404 based on a correction factor 310. Modifying one or more of the hue, saturation, or intensity of the color used to display the region 404 can provide the a more realistic simulation of an illuminated object 304, such as depicted in FIG. 6.

In some embodiments, a run-time rendering process can calculate initial values for incident light using a computationally efficient process (e.g., a traditional rendering process that determines simulated values for diffusively reflected light) and modify the initial values using the correction factors. For example, at runtime, the image manipulation application 302 can perform a first portion of a rendering process to dynamically generate initial incident light values. The image manipulation application 302 can perform a second portion of the rendering process that involves using the correction factors 310 to modify the incident light values. The modified light values can be used by the run-time rendering process to control color information used for the display of one or more portions of the object 304.

For example, the image manipulation application 302 can execute a rendering process to obtain the initial incident light values used to render the view depicted in FIG. 4. The initial incident light values can identify color information for the various portions of the object 304. The image manipulation application 302 can modify color information such as saturation or intensity based on a correction factor 310. The saturation and/or the intensity can be increased based on the correction factor 310 indicating that the weighted average of simulated incident light at a point exceeds the rendering light value at the point. The saturation and/or the intensity can be decreased based on the correction factor 310 indicating that the weighted average of simulated incident light at a point is less than the rendering light value at the point. For example, points on a bright side of a cast shadow may have neighboring points with significantly lower incident energies. For such neighboring points, the local incident energy may be greater than the weighted average of simulated incident light. Points on a dark side of a cast shadow may have a local incident energy that is less than the weighted average of simulated incident light due to the nearby illuminated region. The color information generated using the rendering process and modified using the color correction factors 310 can be used to render the view depicted in FIG. 6.

Although the process 600 is described above with respect to a single simulated light source for illustrative purposes, the image manipulation application 302 can generate correction factors 310 respectively associated with multiple simulated light sources. For example, the rendering data 306 may specify multiple simulated light sources 308 (e.g., overhead, backlight, front light, below light, etc.). For each of the simulated light sources 308, the image manipulation application 302 can determine a separate, independent set of weighted averages. Determination of the weighted averages can also account for spherical harmonics used to more accurately simulate illumination from the simulated light sources 308. Each set of weighted averages for a respective light source can be used to determine a respective set of correction factors 310 associated with that light source to be used for rendering the points of the simulated surface. In a rendering process, a given simulated point can be "illuminated" by several of the light sources specified in the rendering data 304 that have respective associated correction factors 310. The image manipulation application 302 can apply the correction factors 310 for multiple light sources in combination to simulate the total amount of light emitted at that point due to sub-surface scattering of light from the multiple light sources. For example, rendered color information can be determined from a linear combination of respective rendered color information determined with respect to each contributory light source.

Any suitable process can be used for determining the weighted average of simulated incident light for points along the surface of the object 304. For example, the image manipulation application 302 can determine the weighted average of simulated light emitted at a point $r_i$ by summing the weighted contributions from every other point on the surface and dividing by the sum of the weights.

An example of a function for determining the weighted average is $$A_i = \frac{\sum_{j=1}^{N} w_j^i E_j}{\sum_{j=1}^{N} w_j^i}.$$

In the function above, $A_i$ represents the weighted average of simulated light emitted at the point $r_i$, $E_j$ represents the contribution of simulated light from neighboring point $r_j$ at point $r_i$, and $w_j^i$ represents the weight of the contribution of simulated light from neighboring point $r_j$ at point $r_i$. In some embodiments, the weight $w_j^i$ can be determined based on a shortest distance between the point $r_j$ and the point $r_i$. The weight $w_j^i$ can be symmetric such that $w_j^i = w_j^i$.

In some embodiments, the image manipulation application 302 can determine each weight $w_j^i$ by simulating the attenuation of light traveling through a material identified as forming the simulated 3D object 304 (i.e., the "skin" of the simulated 3D object 304 depicted in FIGS. 4 and 6). The simulated attenuation of light can be specific to a type of material being simulated. For example, a given material (e.g., skin, metal, liquid, etc.) having certain physical properties can be identified as forming the simulated 3D object 304. The simulated attenuation can correspond to interactions with the specified material as a result of the material's physical properties as the light travels a given distance through the material.

In a non-limiting example, the image manipulation application 302 can weight each simulated light contribution based on an exponential of the distance between a target point and a neighboring point multiplied by a fixed scalar parameter corresponding to the optical density of the material identified as forming the object 304. An example of a function for simulating the attenuation of light through the simulated 3D object 304 is $$I(x) = I_0 e^{-\alpha x}.$$

In the function above, $I(x)$ represents an intensity of simulated light that has traveled a distance x, x represents a simulated distance travelled through medium by the simulated light, $I_0$ represents an initial intensity of the simulated light, and a represents a scalar parameter related to the attenuating strength or optical density of the material identified as forming the simulated 3D object 304. The product of the scalar parameter corresponding to the optical density and a distance between a given point and a neighboring point can identify a number of mean-free-paths between the two points.

The exponential function above can provide a weight for each contribution, as indicated by the function $$w_j^i = e^{-\alpha |r_i - r_j|}.$$

In the function above, $|r_i - r_j|$ represents the distance between points $r_i$ and $r_j$.

In some embodiments, the difference between these weighted averages of simulated incident light and a dynamically calculated rendering light value can be used to determine an additional diffuse lighting term. The additional diffuse lighting term can be added to the standard diffuse lighting term. The additional diffuse lighting term and standard diffuse lighting term can be used to determine how a simulated material forming the simulated object 304 would respond to simulated illumination. The determined response to the simulated illumination can be used to determine the color information used for rendering that point in the image being rendered. In some embodiments, the additional lighting term can be based on a sub-surface color for the object 304. For example, a red subsurface color can be selected for the skin depicted in FIGS. 4 and 6. The red subsurface color can simulate the effect of blood beneath the surface of the skin. Specifically, simulating the emission of light through the skin as a result of sub-surface scattering can involve increasing a red color in the region 405 based on the simulated incident light values for the region 405. Simulating the incident light resulting from sub-surface scattering in the region 404 can involve coloring the region 404 with the red color.

Figure 10:
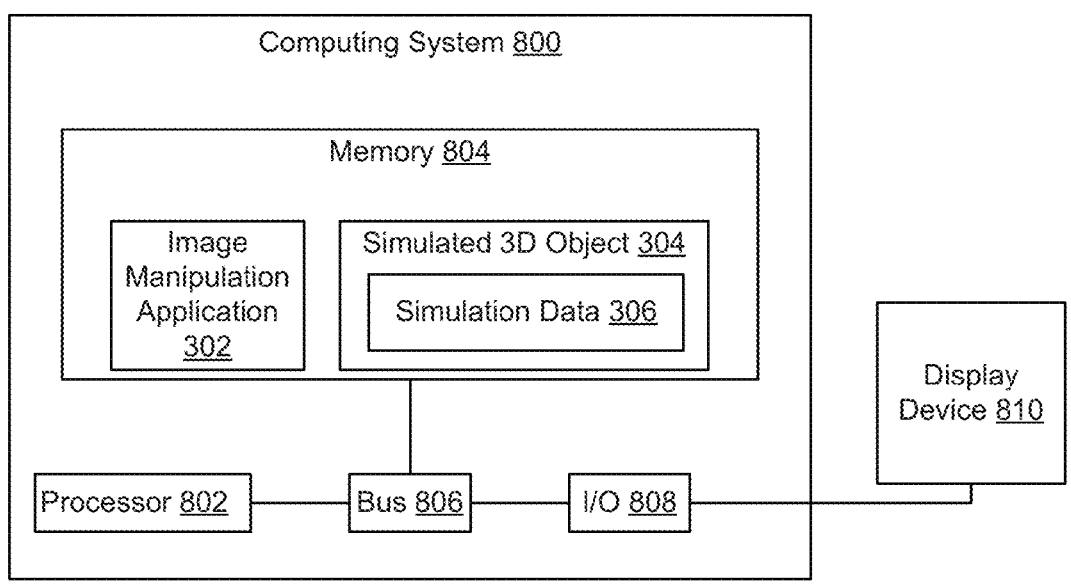
FIG. 10 is a block diagram depicting an example of a computing system for implementing certain embodiments.

Any suitable computing system can be used to execute the image manipulation application 302. FIG. 10 is a block diagram depicting an example of a computing system 800 for implementing certain embodiments.

The computing system 800 can include a processor 802 that is communicatively coupled to a memory 804 and that executes computer-executable program instructions and/or accesses information stored in the memory 804. The processor 802 may comprise a microprocessor, an application-specific integrated circuit ("ASIC"), a state machine, or other processing device. The processor 802 can include any of a number of processing devices, including one. Such a processor can include or may be in communication with a computer-readable medium storing instructions that, when executed by the processor 802, cause the processor to perform the operations described herein.

The memory 804 can include any suitable computer-readable medium. The computer-readable medium can be include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing system 800 may also comprise a number of external or internal devices such as input or output devices. For example, the computing system 800 is shown with an input/output ("I/O") interface 808 and a display device 810. A bus 806 can also be included in the computing system 800. The bus 806 can communicatively couple one or more components of the computing system 800.

The computing system 800 can modify, access, or otherwise use simulated 3D object 304. The simulated 3D object 304 may be resident in any suitable computer-readable medium and execute on any suitable processor. In one embodiment, the simulated 3D object 304 can reside in the memory 804 at the computing system 800. In another embodiment, the simulated 3D object 304 can be accessed by the computing system 800 from a remote content provider via a data network.

The image manipulation application 302 stored in the memory 804 can configure the processor 802 to prepare the simulated 3D object 304 for rendering in a graphical interface and/or render the simulated 3D object 304 in the graphical interface. In some embodiments, the image manipulation application 302 can be a software module included in or accessible by a separate application executed by the processor 802 that is configured to modify, access, or otherwise use the simulated 3D object 304. In other embodiments, the image manipulation application 302 can be a stand-alone application executed by the processor 802.

The computing system 800 can include any suitable computing device for executing the image manipulation application 302. Non-limiting examples of a computing device include a desktop computer, a tablet computer, a laptop computer, or any other computing device suitable for rendering the simulated 3D object 304.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for transforming three-dimensional models by modifying color information applied to a simulated three-dimensional surface to simulate illumination of the surface, wherein the modified color information simulates sub-surface light scattering through the surface, the method comprising:
   accessing a three-dimensional model from a non-transitory computer-readable medium and simulated light sources that simulate spherical harmonics of image-based lighting, the three-dimensional model including the three-dimensional surface, the simulated light sources having at least some negative intensities; and
   pre-processing the three-dimensional model prior to a subsequent rendering operation, wherein pre-processing the model comprises, for each simulated light source:
   determining a first simulated light value for the simulated light source at a point on the three-dimensional surface, wherein the first simulated light value represents an amount of light that is received from the simulated light source and diffusively reflected at the point, wherein determining the first simulated light value comprises integrating, over the three-dimensional surface, a scalar product of a local surface normal and an incident angular flux from the simulated light source,
   determining a second simulated light value at the point, wherein the second simulated light value comprises a weighted average of amounts of simulated incident light that are contributed to the point from neighboring points of the three-dimensional surface, the weighted average representing a scattering of the simulated incident light from the simulated light source that travels from the neighboring points to the point through the three-dimensional surface, generating a correction factor based on a difference between the first and second simulated light values, and transforming the three-dimensional model to include the correction factor, wherein the subsequent rendering operation involves applying the correction factor from the three-dimensional model to the color information generated by the subsequent rendering operation and thereby simulates the sub-surface scattering.

2. The method of claim 1, wherein the correction factor specifies a modification to at least one of a hue, a saturation, or an intensity of a color of the three-dimensional surface.

3. The method of claim 1, further comprising generating a respective correction factor for each of a plurality of simulated light sources.

4. The method of claim 1, wherein determining the second simulated light value including the weighted average comprises:

determining the amounts of simulated light contributed by the neighboring points;

determining a respective weight for each of the amounts of simulated light based on a respective distance between the point and a respective one of the neighboring points.

5. The method of claim 4, wherein determining the second simulated light value further comprises dividing a sum of products of the amounts of simulated light and the respective weights by a sum of the weights.

6. The method of claim 4, wherein the respective weight comprises an exponential function of a respective product of the respective distance and a scalar parameter simulating an optical density of the three-dimensional surface.

7. The method of claim 1, wherein the first simulated light value is determined based on a simulated intensity of the light from the simulated light source, a simulated direction of the light from the simulated light source, and a simulated reflectance parameter of the three-dimensional surface.

8. A system comprising:

a processor; and a non-transitory computer-readable medium communicatively coupled to the processor, wherein the processor is configured for executing instructions stored in the non-transitory computer-readable medium to perform operations for modifying color information applied to a simulated three-dimensional surface to simulate illumination of the surface, wherein the modified color information simulates sub-surface light scattering through the surface, the operations comprising:

accessing, from the non-transitory computer-readable medium or another non-transitory computer-readable medium, a three-dimensional model and simulated light sources that simulate spherical harmonics of image-based lighting, the three-dimensional model including the three-dimensional surface, the simulated light sources having at least some negative intensities, and pre-processing the three-dimensional model prior to a subsequent rendering operation, wherein pre-processing the model comprises, for each simulated light source:

determining a first simulated light value for the simulated light source at a point on the three-dimensional surface, wherein the first simulated light value represents an amount of light that is received from the simulated light source and diffusively reflected at the point, wherein determining the first simulated light value comprises integrating, over the three-dimensional surface, a scalar product of a local surface normal and an incident angular flux from the simulated light source, determining a second simulated light value at the point, wherein the second simulated light value comprises a weighted average of amounts of simulated incident light that are contributed to the point from neighboring points of the three-dimensional surface, the weighted average representing a scattering of the simulated incident light from the simulated light source that travels from the neighboring points to the point through the three-dimensional surface, generating a correction factor based on a difference between the first and second simulated light values, and transforming the three-dimensional model to include the correction factor, wherein the subsequent rendering operation involves applying the correction factor from the three-dimensional model to the color information generated by the subsequent rendering operation and thereby simulates the sub-surface scattering.

9. The system of claim 8, wherein the correction factor specifies a modification to at least one of a hue, a saturation, or an intensity of a color of the three-dimensional surface.

10. The system of claim 8, wherein the operations further comprise generating a respective correction factor for each of a plurality of simulated light sources.

11. The system of claim 8, wherein determining the second simulated light value including the weighted average comprises:

determining the amounts of simulated light contributed by the neighboring points;

determining a respective weight for each of the amounts of simulated light based on a respective distance between the point and a respective one of the neighboring points.

12. The system of claim 11, wherein determining the respective second simulated light value further comprises dividing a sum of products of the amounts of simulated light and the respective weights by a sum of the weights.

13. The system of claim 11, wherein the respective weight comprises an exponential function of a respective product of the respective distance and a scalar parameter simulating an optical density of the three-dimensional surface.

14. The system of claim 8, wherein the first simulated light value is determined based on a simulated intensity of the light from the simulated light source, a simulated direction of the light from the simulated light source, and a simulated reflectance parameter of the three-dimensional surface.

15. A non-transitory computer-readable medium embodying program code executable by a processing device for modifying color information applied to a simulated three-dimensional surface to simulate illumination of the surface, wherein the modified color information simulates sub-surface light scattering through the surface, the non-transitory computer-readable medium comprising:

program code for accessing, from a memory device, a three-dimensional model and simulated light sources that simulate spherical harmonics of image-based lighting, the three-dimensional model including the three-dimensional surface, the simulated light sources having at least some negative intensities; and program code for pre-processing the three-dimensional model prior to a subsequent rendering operation, wherein pre-processing the model comprises, for each simulated light source:
  determining a first simulated light value for the simulated light source at a point on the three-dimensional surface, wherein the first simulated light value represents an amount of light that is received from the simulated light source and diffusively reflected at the point, wherein determining the first simulated light value comprises integrating, over the three-dimensional surface, a scalar product of a local surface normal and an incident angular flux from the simulated light source,
  determining a second simulated light value at the point, wherein the second simulated light value comprises a weighted average of amounts of simulated incident light that are contributed to the point from neighboring points of the three-dimensional surface, the weighted average representing a scattering of the simulated incident light from the simulated light source that travels from the neighboring points to the point through the three-dimensional surface,
  generating a correction factor based on a difference between the first and second simulated light values,
  transforming the three-dimensional model to include the correction factor, wherein the subsequent rendering operation involves applying the correction factor from the three-dimensional model to the color information generated by the rendering operation and thereby simulates the sub-surface scattering.

16. The non-transitory computer-readable medium of claim 15, wherein the correction factor specifies a modification to at least one of a hue, a saturation, or an intensity of a color of the three-dimensional surface.

17. The non-transitory computer-readable medium of claim 15, further comprising program code for generating a respective correction factor for each of a plurality of simulated light sources.

18. The non-transitory computer-readable medium of claim 15, wherein determining the second simulated light value including the weighted average comprises:
  determining the amounts of simulated light contributed by the neighboring points;
  determining a respective weight for each of the amounts of simulated light based on a respective distance between the point and a respective one of the neighboring points.

19. The non-transitory computer-readable medium of claim 18, wherein determining the second simulated light value further comprises dividing a sum of products of the amounts of simulated light and the respective weights by a sum of the weights.

20. The non-transitory computer-readable medium of claim 18, wherein the respective weight comprises an exponential function of a respective product of the respective distance and a scalar parameter simulating an optical density of the three-dimensional surface.

* * * * *